US012583428B2

(12) United States Patent
Nomura et al.

(10) Patent No.: US 12,583,428 B2
(45) Date of Patent: Mar. 24, 2026

(54) ELECTRIC BRAKE APPARATUS

(71) Applicant: Hitachi Astemo, Ltd., Hitachinaka (JP)

(72) Inventors: Daichi Nomura, Hitachinaka (JP);
Takuya Usui, Hitachinaka (JP)

(73) Assignee: HITACHI ASTEMO, LTD., Ibaraki
(JP)

( * ) Notice: Subject to any disclaimer, the term of this
patent is extended or adjusted under 35
U.S.C. 154(b) by 466 days.

(21) Appl. No.: 17/910,164

(22) PCT Filed: Mar. 19, 2021

(86) PCT No.: PCT/JP2021/011361
§ 371 (c)(1),
(2) Date: Sep. 8, 2022

(87) PCT Pub. No.: WO2021/215158
PCT Pub. Date: Oct. 28, 2021

(65) Prior Publication Data
US 2023/0105090 A1     Apr. 6, 2023

(30) Foreign Application Priority Data

Apr. 22, 2020     (JP) ................................. 2020-076012

(51) Int. Cl.
B60T 17/22 (2006.01)
B60T 13/74 (2006.01)
(Continued)

(52) U.S. Cl.
CPC ........... B60T 13/746 (2013.01); B60T 17/22
(2013.01); F16D 65/18 (2013.01); **F16D
66/00** (2013.01);
(Continued)

(58) Field of Classification Search
CPC ...... F16D 65/18; F16D 66/00; F16D 2121/24;
B60T 13/741; B60T 17/22; H02K 7/102;
H02K 27/22
See application file for complete search history.

(56) References Cited

U.S. PATENT DOCUMENTS 10,589,738 B1 *   3/2020  Boecker ................ B60W 30/02
2017/0291585 A1   10/2017  Kobune et al.
(Continued)

FOREIGN PATENT DOCUMENTS

JP          2005-160190          6/2005
JP          2010-7818            1/2010
(Continued)

OTHER PUBLICATIONS

International Search Report issued May 11, 2021 in corresponding
International Application No. PCT/JP2021/011361, with English
language translation.
(Continued)

*Primary Examiner* — Nicholas J Lane
(74) *Attorney, Agent, or Firm* — Wenderoth, Lind &
Ponack, L.L.P.

(57)     ABSTRACT

An electric brake apparatus includes an electric motor
including driving circuits, a brake mechanism configured to
press a braking member against a braking target member
based on driving of the electric motor, and a control device
configured to control the driving of the electric motor. The
control device is configured to detect contact between the
braking member and the braking target member based on a
change in a current of the electric motor when power is
supplied to a part of the driving circuits. A change amount
of the current between before and after the braking member
and the braking target member contact each other is larger
(Continued)

when power is supplied to the part of the driving circuits than when power is supplied to all of the driving circuits.

3 Claims, 3 Drawing Sheets

(51) Int. Cl.

|             |            |
|-------------|------------|
| *F16D 65/18*  | (2006.01)  |
| *F16D 66/00*  | (2006.01)  |
| *H02K 7/102*  | (2006.01)  |
| *F16D 121/24* | (2012.01)  |
| *F16D 125/48* | (2012.01)  |
| *F16D 125/50* | (2012.01)  |

(52) U.S. Cl.
CPC ......... *H02K 7/102* (2013.01); *F16D 2121/24* (2013.01); *F16D 2125/48* (2013.01); *F16D 2125/50* (2013.01)

(56) References Cited

U.S. PATENT DOCUMENTS

| 2019/0093720 A1* | 3/2019 | Masuda ................... H02K 7/06 |
| 2019/0181789 A1* | 6/2019 | Masuda ................. H02K 7/116 |
| 2019/0257378 A1* | 8/2019 | Masuda ............... F16D 65/183 |
| 2022/0024433 A1* | 1/2022 | Yuyama ............... F16D 65/183 |
| 2022/0185250 A1* | 6/2022 | Nakamura ............... H02P 3/04 |

FOREIGN PATENT DOCUMENTS

| JP | 2010-83282   | 4/2010 |
| JP | 2017-22797   | 1/2017 |
| JP | 2018-30434   | 3/2018 |
| WO | 2016/104683  | 6/2016 |

OTHER PUBLICATIONS

Written Opinion of the International Searching Authority issued May 11, 2021 in corresponding International Application No. PCT/JP2021/011361, with English language translation.

\* cited by examiner

ELECTRIC BRAKE APPARATUS

CROSS-REFERENCE TO RELATED APPLICATION

The present application claims priority under the Paris Convention to Japanese Patent Application No. 2020-076012 filed on Apr. 22, 2020. The entire disclosure of Japanese Patent Application No. 2020-076012 including the specification, the claims, the drawings, and the abstract is incorporated herein by reference in its entirety.

TECHNICAL FIELD

The present invention relates to an electric brake apparatus.

BACKGROUND ART

In a brake apparatus configured to generate a braking force by pressing brake pads (a braking member) against a disk rotor (a braking target member) rotating together with a wheel, a position at which the brake pads contact the disk rotor is detected for the purpose of securing excellent brake responsiveness, prevention of a drag of the brake pads, and the like. For example, Japanese Patent Application Publication No. 2010-83282 discloses a method that stores a current pattern corresponding to one rotation of a motor in a clearance region where no braking force is generated, and, after that, acquires a correct current with the influence of a current ripple removed by subtracting the stored current pattern from a motor current when the motor is actuated in a force increasing direction, and detects the contact point between the disk rotor and the brake pads based on whether a positional change amount of this corrected current exceeds a threshold value.

SUMMARY OF INVENTION

Technical Problem

However, the above-described detection method discussed in Japanese Patent Application Publication No. 2010-83282 has a problem that the detection accuracy is not sufficient or the detection takes time due to a small change amount (gradient) of the current with respect to the thrust force.

The present invention has been conceived in consideration of the above-described problem, and an object thereof is to increase the accuracy of detecting the contact of the braking member with the braking target member.

Solution to Problem

According to one aspect of the present invention, an electric brake apparatus includes an electric motor including a plurality of driving circuits, an electric mechanism configured to press a braking member against a braking target member based on driving of the electric motor, and a control device configured to control the driving of the electric motor. The control device detects contact between the braking member and the braking target member based on a change in a current of the electric motor when power is supplied to a part of the driving circuits among the plurality of driving circuits.

The electric brake apparatus according to the one aspect of the present invention is configured in this manner, and this allows the electric brake apparatus to increase the accuracy of detecting the contact of the braking member with the braking target member.

DESCRIPTION OF EMBODIMENTS

Figure 1:
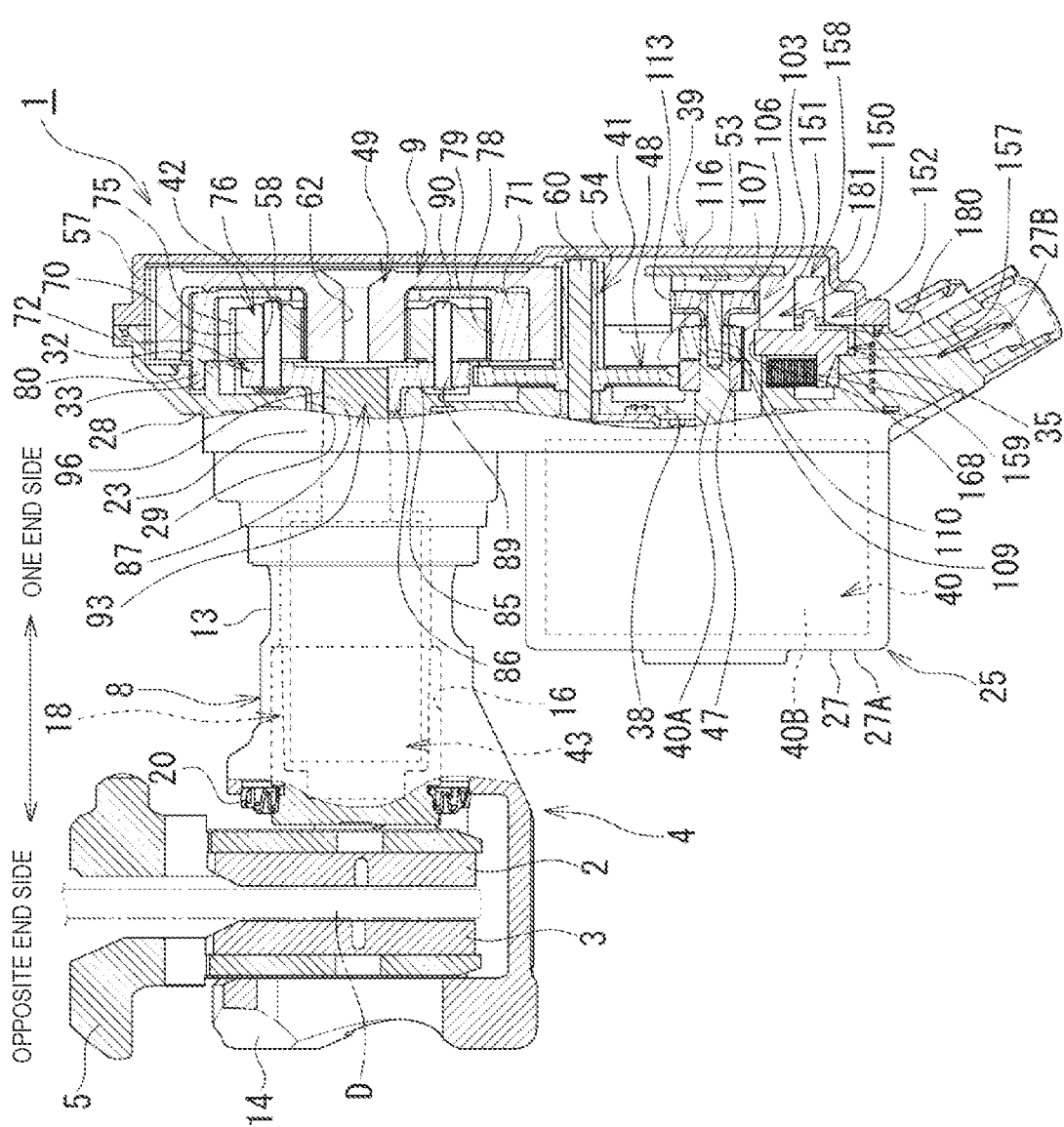
FIG. 1 is a cross-sectional view of main portions of an electric brake apparatus according to an embodiment of the present invention.

In the following description, embodiments will be described with reference to the drawings. Common portions will be identified by the same reference numerals throughout all the drawings.

An electric brake apparatus 1 according to an embodiment of the present invention is an electric disk brake that generates a braking force based on driving of an electric motor 40, which is an electrically-driven motor, when a vehicle runs normally. In the following description, the present embodiment will be described, referring to the internal side of the vehicle (an inner side) as one end side (a cover member 39 side), and the external side of the vehicle (an outer side) as the opposite end side (a disk rotor D side) as necessary. In other words, the present embodiment will be described, referring to the right side and the left side in FIG. 1 as the one end side and the opposite end side, respectively, as necessary.

As illustrated in FIG. 1, the electric brake apparatus 1 according to the embodiment of the present invention includes a pair of inner and outer brake pads 2 and 3 and a caliper 4. The pair of inner and outer brake pads 2 and 3 is disposed on both the axial sides in such a manner that the disk rotor D is interposed between them, and serves as a braking member. The disk rotor D is mounted at a rotatable portion of the vehicle. The present electric brake apparatus 1 is configured as a floating caliper-type brake apparatus. The pair of inner and outer brake pads 2 and 3, and the caliper 4 are supported on a bracket 5 movably in the axial direction of the disk rotor D. The bracket 5 is fixed to a non-rotational portion such as a knuckle of the vehicle.

As illustrated in FIG. 1, the caliper 4 includes a caliper main body 8 and a transmission mechanism 9. The caliper main body 8 is a main body of the caliper 4. The transmission mechanism 9 transmits a rotation from the electric motor 40 to a piston 18 in a cylinder portion 13 of the caliper main body 8, thereby applying a thrust force to the piston 18. The caliper main body 8 includes the cylindrical cylinder portion 13 and a pair of claw portions 14 and 14. The cylinder portion 13 is disposed on the proximal end side facing the inner brake pad 2, and is opened toward the inner brake pad 2. The pair of claw portions 14 and 14 extends from the cylinder portion 13 to the outer side across over the disk rotor D, and is disposed on the opposite end side so as to face the outer brake pad 3.

The piston 18 is contained non-rotatably and axially movably relative to the cylinder portion 13 inside the cylinder portion 13 of the caliper main body 8, i.e., in a cylinder bore 16 of the cylinder portion 13. This piston 18 is used to press the inner brake pad 2 and is formed into a bottomed cylindrical shape, and is contained in the cylinder bore 16 of the cylinder portion 13 in such a manner that the bottom portion thereof faces the inner brake pad 2. The piston 18 is supported non-rotatably relative to the cylinder bore 16 and thus the caliper main body 8 due to engagement prohibiting a rotation between the bottom portion thereof and the inner brake pad 2.

A seal member (not illustrated) is disposed in the cylinder bore 16 of the cylinder portion 13 on the inner peripheral surface thereof on the opposite end side. Then, the piston 18 is contained in the cylinder bore 16 axially movably in a state in contact with this seal member. A dust boot 20 is interposed between the outer peripheral surface of the piston 18 on the bottom portion side thereof and the inner peripheral surface of the cylinder bore 16 on the opposite end side thereof. The electric brake apparatus 1 is configured to prevent an entry of a foreign object into the cylinder bore 16 of the cylinder portion 13 with the aid of these seal member and dust boot 20.

A gear housing 25 is integrally coupled with a bottom wall 23 side (the one end side) of the cylinder portion 13 of the caliper main body 8. An electric motor 40, a multi-stage spur speed reduction mechanism 41, and a planetary gear speed reduction mechanism 42, which will be described below, are disposed inside this gear housing 25. The gear housing 25 includes a first gear housing portion 27 and a second gear housing portion 28. The first gear housing portion 27 mainly contains the electric motor 40. The second gear housing portion 28 mainly contains the planetary gear speed reduction mechanism 42. The first gear housing portion 27 includes a motor housing portion 27A and a gear housing portion 27B. A columnar main body portion 40B of the electric motor 40 is contained in the motor housing portion 27A. A rotational shaft 40A extending from the columnar main body portion 40B of the electric motor 40 is contained in the gear housing portion 27B. A containing recessed portion 35 is formed in the gear housing portion 27B. The containing recessed portion 35 is provided to contain a compression coil spring 159 of a braking force holding mechanism 152, which will be described below. Further, a containing portion (not illustrated) for containing a support pin (not illustrated) protruding toward the one end side and a solenoid actuator (not illustrated) of the braking force holding mechanism 152, which will be described below, is formed in the gear housing portion 27B at a position close to the containing recessed portion 35.

The bottom wall 23 of the cylinder portion 13 is integrally coupled with the second gear housing portion 28 from the opposite end side thereof. As a result, the cylinder portion 13 and the motor housing portion 27A of the first gear housing portion 27 (the electric motor 40) are disposed so as to be arranged generally in parallel with each other. An insertion hole 29 is formed on the second gear housing portion 28. A small-diameter cylindrical portion 86 of a carrier 72 including a spindle 93, which will be described below, is inserted through the insertion hole 29. A cylindrical restriction portion 32 is provided in a manner protruding from the bottom surface of the second gear housing portion 28. The cylindrical restriction portion 32 restricts a radial movement of an internal gear 71, which will be described below. An annular groove portion 33 is formed on the radially outer side of this cylindrical restriction portion 32 between the cylindrical restriction portion 32 and a wall surface facing the cylindrical restriction portion 32. A plurality of engagement recessed portions (not illustrated) is formed on the wall surface facing the cylindrical restriction portion 32 at circumferential intervals. A cutout portion (not illustrated) is formed on the cylindrical restriction portion 32 so as to avoid interference with a large-diameter gear 53 of a first speed reduction gear 48, which will be described below. The opening of the gear housing 25 on the one end side is closed by the cover member 39. The cover member 39 is air-tightly attached to the gear housing 25.

The rotation from the electric motor 40 is transmitted to the piston 18 via the transmission mechanism 9. The transmission mechanism 9 includes the rotational shaft 40A, the multi-stage spur speed reduction mechanism 41 and the planetary gear speed reduction mechanism 42, and a rotation-linear motion conversion mechanism 43. The rotational shaft 40A extends from the columnar main body portion 40B of the electric motor 40. The multi-stage spur speed reduction mechanism 41 and the planetary gear speed reduction mechanism 42 power up a rotational torque from the rotational shaft 40A. The rotation-linear motion conversion mechanism 43 converts a rotation from the planetary gear speed reduction mechanism 42 into a linear motion and applies the thrust force to the piston 18. The columnar main body portion 40B of the electric motor 40 is disposed in the motor housing portion 27A of the first gear housing portion 27 as described above, and the rotational shaft 40A thereof is inserted through a through-hole 38 of the gear housing portion 27B and extends into the gear housing portion 27B. The multi-stage spur speed reduction mechanism 41 includes a pinion gear 47, the first speed reduction gear 48, and a second speed reduction gear 49. The first speed reduction gear 48 and the second speed reduction gear 49 are made from metal or resin such as fiber-reinforced resin.

The pinion gear 47 is cylindrically formed, and is fixedly press-fitted to the rotational shaft 40A of the electric motor 40. The first speed reduction gear 48 includes the large-diameter gear 53 having a large diameter and a small-diameter gear 54 having a small diameter. The large-diameter gear 53 is formed by a stepped gear, and is meshed with the pinion gear 47. The small-diameter gear 54 extends axially from the large-diameter gear 53 toward the one end side coaxially. Further, the first speed reduction gear 48 is arranged in such a manner that the large-diameter gear 53 thereof extends across the first gear housing portion 27 and the second gear housing portion 28 so as to enter in the cutout portion (not illustrated) provided on the cylindrical restriction portion 32 of the second gear housing portion 28 and a cutout portion (not illustrated) provided on a cylindrical wall portion 80 of the internal gear 71. As a result, the outer peripheral surface of the large-diameter gear 53 of the first speed reduction gear 48 is disposed so as to face in vicinity to the outer peripheral surface of a larger-diameter annular plate-like portion 85 of the carrier 72, which will be described below. The first speed reduction gear 48 is rotatably supported by a support rod 60, and this support rod 60 is fixedly press-fitted to the gear housing portion 27B of the first gear housing portion 27. The small-diameter gear 54 is formed so as to have a substantially longer axial length than the axial length of the large-diameter gear 53. The axial length of the small-diameter gear 54 is approximately equal to the axial length of a large-diameter gear 57 of the second speed reduction gear 49, which will be described below.

The small-diameter gear 54 of the first speed reduction gear 48 is meshed with the second speed reduction gear 49. This second speed reduction gear 49 includes the large-diameter gear 57 having a large diameter and a sun gear 58 having a small diameter. The large-diameter gear 57 is meshed with the small-diameter gear 54 of the first speed reduction gear 48. The sun gear 58 extends axially from the large-diameter gear 57 toward the opposite end side coaxially. The second speed reduction mechanism 49 is contained in the second gear housing portion 28. A through-hole 62 is formed at the radially central portion of the second speed reduction gear 49. The through-hole 62 axially extends therethrough. The sun gear 58 is configured as a part of the planetary gear speed reduction mechanism 42. The large-diameter gear 57 and the sun gear 58 are approximately equal to each other in axial length thereof. An annular space (not illustrated) is formed between the inner peripheral surface of the large-diameter gear 57 and the outer peripheral surface of the sun gear 58.

The planetary gear speed reduction mechanism 42 includes the sun gear 58 of the second speed reduction gear 49, a plurality of planetary gears 70 (five gears in the present embodiment), and the internal gear 71. A rotation from the planetary gear speed reduction mechanism 42, i.e., a rotation from each of the planetary gears 70 is transmitted to the carrier 72. Each of the planetary gears 70 includes a gear 75 and a hole portion 76. The gear 75 is meshed with the sun gear 58 and inner teeth 78 of the internal gear 71. A pin 90 erected from the carrier 72 is rotatably inserted through the hole portion 76. The individual planetary gears 70 are arranged at circumferentially even intervals around the sun gear 58. More specifically, the individual planetary gears 70 are arranged at circumferentially even intervals in the annular space between the inner peripheral surface of the large-diameter gear 57 and the outer peripheral surface of the sun gear 58, and the gears 75 thereof are meshed with the sun gear 58 and the inner teeth 78 of the internal gear 71.

The internal gear 71 includes the inner teeth 78, an annular wall portion 79, and a cylindrical wall portion 80. The inner teeth 78 are meshed with the gears 75 of the individual planetary gears 70, respectively. The annular wall portion 79 extends to the radial center continuously from one end of the inner teeth 78 and restricts an axial movement of each of the planetary gears 70. The cylindrical wall portion 80 extends from the inner teeth 78 toward the opposite end side. The portion of the internal gear 71 as the inner teeth 78 is disposed between the inner peripheral surface of the large-diameter gear 57 of the second speed reduction gear 49 and each of the planetary gears 70. As a result, the second speed reduction gear 49 is supported rotatably relative to the internal gear 71. The surface of the portion of the internal gear 71 as the inner teeth 78, each of the planetary gears 70, and the sun gear 58 on the opposite end side are generally coplanarly located. A plurality of engagement protrusion portions (not illustrated) is formed on the cylindrical wall portion 80 of the internal gear 71 at circumferential intervals. The engagement protrusion portions are provided in a radially outwardly protruding manner.

The cutout portion (not illustrated) is formed at a circumferential part of the cylindrical wall portion 80 of the internal gear 71 so as to avoid the interference with the large-diameter gear 53 of the first speed reduction gear 48. Then, while one end surface of the cylindrical wall portion 80 of the internal gear 71 is brought into abutment with the bottom surface of the second gear housing portion 28, the inner peripheral surface of this cylindrical wall portion 80 is brought into abutment with the outer peripheral surface of the cylindrical restriction portion 32 of the second gear housing portion 28. Along therewith, each of the engagement protrusion portions provided in a manner protruding from the cylindrical wall portion 80 is engaged with each of the engagement recessed portions provided on the wall surface of the second gear housing portion 28. Further, the internal gear 71 is supported so as to be restricted from moving radially and axially and also prohibited from rotating relative to the gear housing 25 by the second speed reduction gear 49.

The carrier 72 includes the large-diameter annular plate-like portion 85 and the small-diameter cylindrical portion 86. The small-diameter cylindrical portion 86 is provided in a manner concentrically protruding from the large-diameter annular plate-like portion 85 toward the opposite end side. The carrier 72 includes a spline hole portion 87 formed at approximately the radial center thereof so as to axially extend therethrough. The large-diameter annular plate-like portion 85 is disposed on the inner side of the cylindrical restriction portion 32 of the second gear housing portion 28. A plurality of pin hole portions 89 is formed on the outer peripheral side of the large-diameter annular plate-like portion 85 of the carrier 72 at circumferential intervals in correspondence with the planetary gears 70, respectively. The pins 90 are fixedly press-fitted in the individual pin hole portions 89, respectively. The individual pins 90 are rotatably inserted through the hole portions 76 of the individual planetary gears 70, respectively. The small-diameter cylindrical portion 86 of the carrier 72 is inserted through the insertion hole 29 of the second gear housing portion 28.

The spindle 93 is configured to receive a rotation from the carrier 72 and transmit a rotational torque thereof to the rotation-linear motion conversion mechanism 43. A spline shaft portion 96 is integrally connected to one end of the spindle 93. The spline shaft portion 96 is engaged with the spline hole portion 87 of the carrier 72. The spindle 93 extends in the cylinder bore 16, and is coupled with the rotation-linear motion conversion mechanism 43. The spline shaft portion 96 of the spindle 93 is engaged with the spline hole portion 87 of the carrier 72, thereby allowing the carrier 72 and the spindle 93 to transmit the rotational torque to each other therebetween.

Further, a parking brake unit 150 is provided in the gear housing portion 27B of the first gear housing portion 27. The parking brake unit 150 includes a ratchet gear 151 and the braking force holding mechanism 152. The ratchet gear 151 is fixedly press-fitted to one end of the rotational shaft 40A of the electric motor 40, which is the transmission mechanism 9. The braking force holding mechanism 152 holds a braking force by restricting a rotation of the ratchet gear 151 in a direction for releasing the braking force based on driving of the solenoid actuator. The ratchet gear 151 is fixedly press-fitted to the one end of the rotational shaft 40A that protrudes from the pinion gear 47. The braking force holding mechanism 152 includes the solenoid actuator, a holding member 157, an engagement member 158, and the compression coil spring 159.

The solenoid actuator is actuated based on an instruction from a control board 116, which will be described below. The holding member 157 serves to restrict the rotation of the ratchet gear 151 in the direction for releasing the braking force by moving according to the driving of the solenoid actuator, and includes a claw portion 168 engageable with the ratchet gear 151. The engagement member 158 is coupled with the holding member 157 and supported rotatably about the support pin provided on the gear housing portion 27B of the first housing 27, and serves to prohibit a movement of the holding member 157 toward the ratchet gear 151 side. The engagement member 158 is formed into a generally L-like shape including a plate-like portion 180 and a weight portion 181 extending from the proximal end portion of the plate-like portion 180 toward the cover member 39 side (the one end side). The compression coil spring 159 works as an elastic member that biases the holding member 157 in a direction away from the ratchet gear 151.

In the configuration provided as described above, first, the claw portion 168 of the holding member 157 is biased by the compression coil spring 159 in the direction away from the ratchet gear 151 under normal circumstances. Further, when an excitation force from outside is applied to the holding member 157 under these normal circumstances, a force canceling out the excitation force from outside can be applied to the holding member 157 with the aid of the weight portion 181 of the engagement member 158. More specifically, when the excitation force is applied to the holding member 157 in a direction for moving the claw portion 168 thereof toward the outer peripheral surface of the ratchet gear 151, a force is applied to the engagement member 158 so as to move the engagement member 158 in a direction opposite from the direction in which the excitation force is applied to the holding member 157. As a result, the force can be applied to the holding member 157 in the direction for separating the claw portion 168 thereof from the outer peripheral surface of the ratchet gear 151 (the force for preventing the claw portion 168 from moving toward the outer peripheral surface of the ratchet gear 151) with the aid of the weight portion 181 of the engagement member 158, and thus the excitation force applied from outside to the holding member 157 can be canceled out with the aid of the weight portion 181 of the engagement member 158.

This situation occurs when the excitation force applied to the holding member 157 exceeds the biasing force of the compression coil spring 159. Next, when the parking brake is actuated to keep the vehicle in a stopped state, power is supplied to the solenoid actuator to thus actuate the solenoid actuator. As a result, the claw portion 168 of the holding member 157 moves toward the outer peripheral surface of the ratchet gear 151 and is engaged therewith as if counteracting the biasing force of the compression coil spring 159. At this time, the weight portion 181 (the center of gravity) of the engagement member 158 is supposed to move in the direction opposite from the actuation direction of the solenoid actuator when the solenoid actuator is actuated.

On the other hand, a rotational angle detector 103 is disposed on the one end side of the ratchet gear 151 of the parking brake unit 150. The rotational angle detector 103 detects the rotational angle of the rotational shaft 40A of the electric motor 40. This rotational angle detector 103 includes a magnet member 106 and a magnetic detection IC chip 107. A press-fitting recessed portion 109 is formed on the surface of the rotational shaft 40A of the electric motor 40 at the one end thereof. A support rod 110 is fixedly press-fitted in this press-fitting recessed portion 109. The ring-like magnet member 106 is supported on this support rod 110. The magnet member 106 is disposed in a cup-like support member 113. The magnetic detection IC chip 107 is disposed so as to face the one end side of the magnet member 106. The magnet detection IC chip 107 detects a change in a magnetic field generated from the magnet member 106. This magnetic detection IC chip 107 is mounted on the control board 116. Then, the rotational angle detector 103 detects the change in the magnetic flux generated from the magnet member 106 rotating according to the rotation of the rotational shaft 40A by the magnetic detection IC chip 107, thereby calculating and detecting the rotational angle (position) of the rotational shaft 40A of the electric motor 40 by the control board 116.

The rotation-linear motion conversion mechanism 43 is configured to convert the rotational motion from the multi-stage spur speed reduction mechanism 41 and the planetary gear speed reduction mechanism 42, i.e., the rotational motion from the spindle 93 into a motion in a linear direction (hereinafter referred to as a linear motion for convenience), thereby applying the thrust force to the piston 18 with the use of the movement of a linear motion member thereof (not illustrated). The rotation-linear motion conversion mechanism 43 is disposed in the cylinder bore 16 between the bottom surface thereof and the piston 18. Then, when the spindle 93 rotates according to the rotation of the carrier 72, the linear motion member of the rotation-linear motion conversion mechanism 43 moves forward toward the opposite end side, and the piston 18 moves forward according thereto and presses the inner brake pad 2 against the disk rotor D.

The electric motor 40 includes the columnar main body portion 40B and the rotational shaft 40A extending from the one end surface of the columnar main body portion 40B. The axial direction of the columnar main body portion 40B matches the movement direction of the piston 18, and the rotational shaft 40A extends from the one end surface thereof. The columnar main body portion 40B of the electric motor 40 is disposed in the motor housing portion 27A of the first gear housing portion 27 as described above, and the rotational shaft 40A thereof is inserted through the through-hole 38 of the gear housing portion 27B and extends into the gear housing portion 27B. The driving of the electric motor 40 is controlled according to an instruction from the control board 116. At the time of braking when the vehicle normally runs, the driving of the electric motor 40 is controlled by the control board 116 based on detection signals from a detection sensor corresponding to a driver's request and various detection sensors that detect various situations requiring the brake, a detection signal from the rotational angle detector 103, and a detection signal from a thrust force sensor (not illustrated) and the like. Further, this control board 116 is electrically connected to a parking brake switch (not illustrated), a stroke sensor (not illustrated) attached to a brake pedal operated to instruct the electric brake apparatus 1 to actuate the parking brake, and the like, and the actuation of the solenoid actuator of the braking force holding mechanism 152 is controlled according to an instruction from the control board 116.

Figure 2:
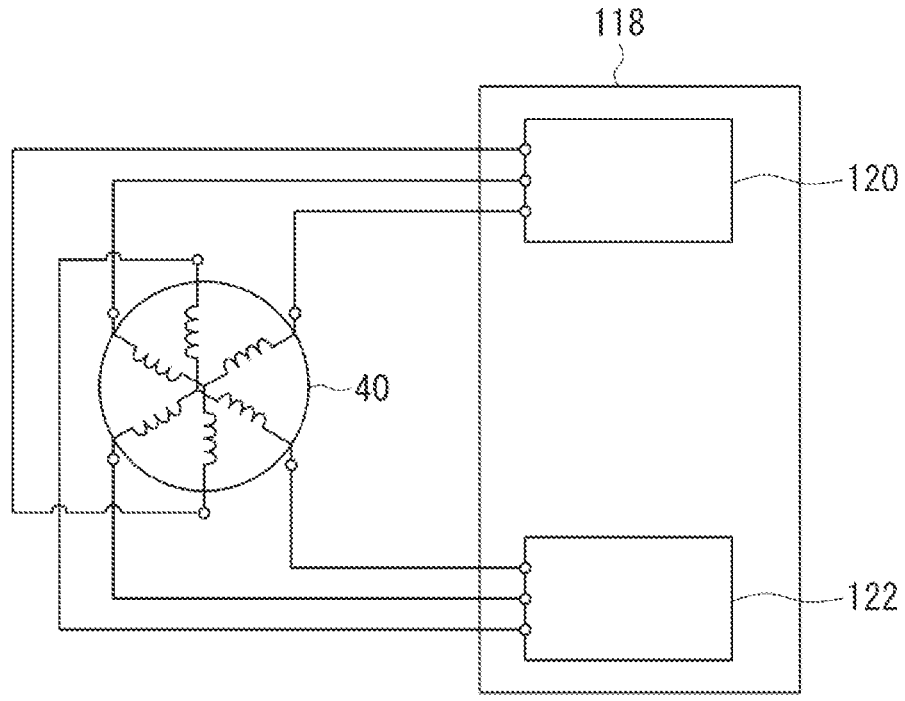
FIG. 2 illustrates a general concept of a connection that schematically indicates an example of a connection between an electric motor and a plurality of driving circuits in the electric brake apparatus according to the embodiment of the present invention.

More specifically, an electronic control device 118 configured as illustrated in FIG. 2 is mounted on the control board 116 according to the present embodiment, and this electronic control device 118 includes two driving circuits 120 and 122 for driving the electric motor 40. Then, the electronic control device 118 controls the electric motor 40 by supplying power from these two driving circuits 120 and 122 to the electric motor 40 based on the various signals like the above-described examples. Now, the electric motor 40 according to the present embodiment is a six-phase electric motor having double three-phase windings, and is connected so as to be driven by at least any one of the two driving circuits 120 and 122. Further, the electronic control device 118 is configured to detect contact between the inner brake pad 2 and the outer brake pad 3 and the disk rotor D, and set, for example, a clearance between the inner brake pad 2 and the outer brake pad 3 and the disk rotor D using a result of this detection, as will be described in detail below.

Next, braking and braking release functions when the vehicle runs normally, which are exerted in the electric brake apparatus 1 according to the present embodiment, will be described with reference to FIGS. 1 and 2.

At the time of the braking when the vehicle runs normally, the electric motor 40 is driven according to the instruction from the control board 116, and the rotation thereof in a forward direction, i.e., a braking direction is transmitted to the sun gear 58 of the planetary gear speed reduction mechanism 42 via the multi-stage spur speed reduction mechanism 41. At this time, normally, the electronic control device 118 mounted on the control board 116 drives the electric motor 40 by supplying power from both the two driving circuits 120 and 122 to the electric motor 40. Then, the rotation of the sun gear 58 of the planetary gear speed reduction mechanism 42 causes each of the planetary gears 70 to revolve around the rotational axis of the sun gear 58 while rotating around its own rotational axis, thereby causing the carrier 72 to rotate. In other words, the rotation from the electric motor 40 is transmitted to the carrier 72 while being slowed down and powered up at a predetermined speed reduction ratio by being transmitted via the multi-stage spur speed reduction mechanism 41 and the planetary gear speed reduction mechanism 42. Then, the rotation from the carrier 72 is transmitted to the spindle 93.

Subsequently, when the spindle 93 rotates according to the rotation of the carrier 72, due to the operation of the rotation-linear motion conversion mechanism 43, the linear motion member thereof moves forward, thereby causing the piston 18 to move forward. Due to the forward movement of this piston 18, the inner brake pad 2 is pressed against the disk rotor D. Then, due to a reaction force to the pressing force from the piston 18 to the inner brake pad 2, the caliper main body 8 moves to the inner side with respect to the bracket 5, and the outer brake pad 3 is pressed against the disk rotor D by each of the claw portions 14 and 14. As a result thereof, a frictional force is generated with the disk rotor D sandwiched between the pair of inner and outer brake pads 2 and 3, and this eventually leads to generation of the braking force on the vehicle. Because the electric brake apparatus 1 is configured in this manner, the above-described multi-stage spur speed reduction mechanism 41, the planetary gear speed reduction mechanism 42, the carrier 72, the spindle 93, the rotation-linear motion conversion mechanism 43, the piston 18, and the like correspond to an electric mechanism of the present invention.

On the other hand, at the time of the braking release, the rotational shaft 40A of the electric motor 40 rotates in the opposite direction, i.e., a braking release direction via the two driving circuits 120 and 122 according to the instruction from the control board 116, and this rotation in the opposite direction is also transmitted to the spindle 93 via the multi-stage spur speed reduction mechanism 41 and the planetary gear speed reduction mechanism 42. As a result, due to the operation of the rotation-linear motion conversion mechanism 43, the linear motion member thereof moves backward to return to the initial state according to the rotation of the spindle 93 in the opposite direction, and the braking force applied to the disk rotor D by the pair of inner and outer brake pads 2 and 3 is released.

Next, the actuation of the parking brake in the electric brake apparatus 1 according to the present embodiment will be described.

When the parking brake switch or the brake pedal is operated, the electric motor 40 is driven according to the instruction from the control board 116 and this rotation in the forward direction is transmitted to the carrier 72 via the multi-stage spur speed reduction mechanism 41 and the planetary gear speed reduction mechanism 42, similarly to the actuation at the time of the normal braking. At this time, normally, the electronic control device 118 mounted on the control board 116 drives the electric motor 40 by supplying power from both the two driving circuits 120 and 122 to the electric motor 40. The electric motor 40 can also be driven according to an instruction from the control board 116 based on a signal from the vehicle side without receiving an operation of the driver. Subsequently, when the spindle 93 rotates according to the rotation from the carrier 72, the piston 18 moves forward due to the operation of the rotation-linear motion conversion mechanism 43, and the disk rotor D is sandwiched between the pair of inner and outer brake pads 2 and 3 and the braking force is generated.

The solenoid actuator is actuated by supplying power to the solenoid actuator of the braking force holding mechanism 152 according to the instruction from the control board 116 in this state. As a result, the claw portion 168 of the holding member 157 moves toward the outer peripheral surface of the ratchet gear 151 to be engaged therewith as if counteracting the biasing force of the compression coil spring 159. At this time, the weight portion 181 (the center of gravity) of the engagement member 158 is supposed to move in the direction opposite from the thrust direction of the solenoid actuator. At this time, the ratchet gear 151 and the claw portion 168 of the holding member 157 may fail to be engaged due to interference of the respective top portions with each other, and, therefore the electric motor 40 is next rotated in the braking release direction, thereby ensuring that the ratchet gear 151 and the claw portion 168 of the holding member 157 are engaged. Then, after the power supply to the electric motor 40 is stopped and the pressing force of the pair of brake pads 2 and 3 to the disk rotor D is confirmed, the power supply to the solenoid actuator is stopped and the engaged state is maintained between the ratchet gear 151 and the claw portion 168 of the holding member 157. This allows the electric brake apparatus 1 to maintain the braking state with the power supply stopped for the electric motor 40 and the solenoid actuator.

Next, when the actuation of the parking brake is released, the electric actuator 40 is slightly rotated in the braking direction according to the instruction from the control board 116 without power supplied to the solenoid actuator of the braking holding mechanism 152, by which the engagement is loosened between the ratchet gear 151 and the claw portion 168 of the holding member 157. As a result, the claw portion 168 of the holding member 157 moves under the biasing force of the compression coil spring 159 in the direction away from the outer peripheral surface of the ratchet gear 151 and thus the restriction on the rotation of the ratchet gear 151 is released, by which the piston 18 moves backward due to the rotation of the electric motor 40 in the braking release direction and the braking force applied by the pair of inner and outer brake pads 2 and 3 is released.

Subsequently, a method for detecting the contact between the inner and outer brake pads 2 and 3 and the disk rotor D by the electronic control device 118 mounted on the control board 116 will be described. Assume that this contact detection is conducted at an appropriate timing not interfering with the braking by the electric brake apparatus 1.

First, the electronic control device 118 is configured to detect the rotational angle of the rotational shaft 40A of the electric motor 40, i.e., the position of the electric motor 40 using the above-described magnetic detection IC chip 107 or the like and also detect the value of a current flowing in the electric motor 40 using a current sensor (not illustrated). Then, the electronic control device 118 detects the contact between the pair of brake pads 2 and 3 and the disk rotor D based on a change in the current flowing in the electric motor 40 when the electric motor 40 is driven by supplying power to only any one of the two driving circuits 120 and 122.

Figure 3:
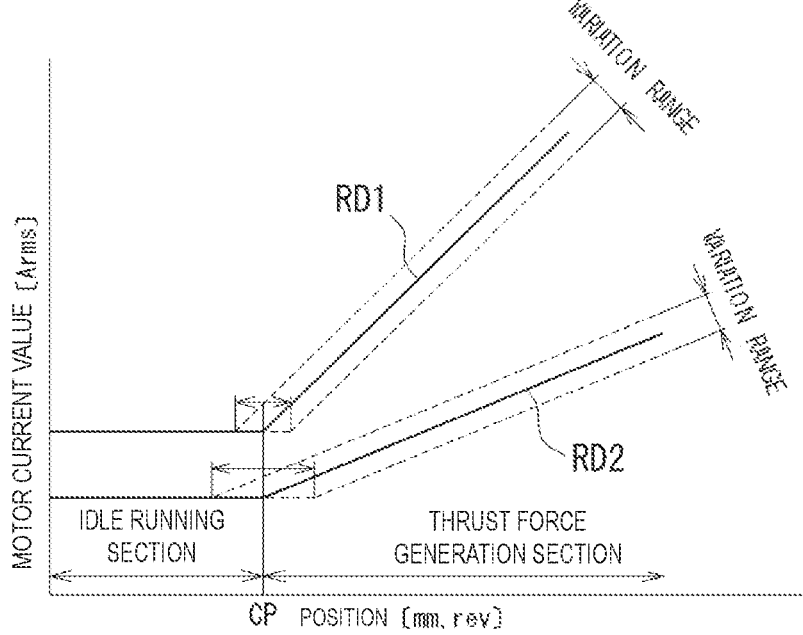
FIG. 3 is a graph indicating the relationship between the position of the electric motor and a current in the electric brake apparatus according to the embodiment of the present invention.

Then, FIG. 3 illustrates the relationship between the position of the electric motor 40 and the value of the current flowing in the electric motor 40, which are detected by the electronic control device 118. An upper polygonal line RD1 of two polygonal lines illustrated in FIG. 3 represents the relationship when power is supplied to only any one of the two driving circuits 120 and 122, and a lower polygonal line RD2 represents the relationship when power is supplied to both the two driving circuits 120 and 122. A position labeled alphabets CP on the horizontal axis representing the position of the electric motor 40 indicates the position where the brake pads 2 and 3 and the disk rotor D contact each other, which is a switching point between an idle running section and a thrust force generation section. The respective variation ranges are indicated by dashed lines on the polygonal lines RD1 and RD2.

As indicated in FIG. 3 illustrated in the above-described manner, the value of the current flowing in the electric motor 40 is higher when power is supplied to only any one of the driving circuits 120 and 122 (RD1) than when power is supplied to both the two driving circuits 120 and 122 (RD2). Then, the value of the current flowing in the electric motor 40 increases since after the contact position CP on both RD1 and RD2. Therefore, the electronic control device 118 utilizes such a point at which the current value starts increasing for the detection of the contact position CP between the pair of brake pads 2 and 3 and the disk rotor D. Now, as clearly seen from FIG. 3, the change amount (the gradient) of the increase in the current value increasing since after the contact position CP is larger on RD1 than on RD2. Therefore, as indicated by a horizontal arrow extending with the contact position CP placed at the center thereof on each of RD1 and RD2 in FIG. 3, the accuracy of detecting the contact position CP when the variation range is taken into consideration is higher for RD1, on which the length of this horizontal arrow is short, than for RD2, on which the length of the horizontal arrow is long. Therefore, the electronic control device 118 detects the point at which the value of the current flowing in the electric motor 40 starts increasing when power is supplied to only any one of the two driving circuits 120 and 122 (RD1) with use of the gradient thereof or a threshold value, thereby detecting it as the contact position CP.

Next, a method for detecting the contact between the brake pads 2 and 3 and the disk rotor D in a configuration including two electric motors 40, such as when the caliper 4 of the electric brake apparatus 1 is a twin-bore caliper, will be described with reference to FIG. 4. In the embodiment illustrated in FIG. 4, the electronic control device 118 mounted on the control board 116 includes the two driving circuits 120 and 122. Then, the driving circuit 120 is connected so as to supply power to one three-phase electric motor 40 and the driving circuit 122 is connected so as to supply power to the other three-phase electric motor 40. In such a configuration, at the time of the braking when the vehicle runs normally or the braking according to the parking brake, the electronic control device 118 supplies power from both the driving circuits 120 and 122 to drive the two electric motors 40, thereby generating and releasing the braking force. On the other hand, when detecting the contact between the pair of brake pads 2 and 3 and the disk rotor D, the electronic control device 118 supplies power to only any one of the two driving circuits 120 and 122 to drive any one of the two electric motors 40, and detects the contact position CP based on a change in the current flowing in this electric motor 40 at that time.

Figure 4:
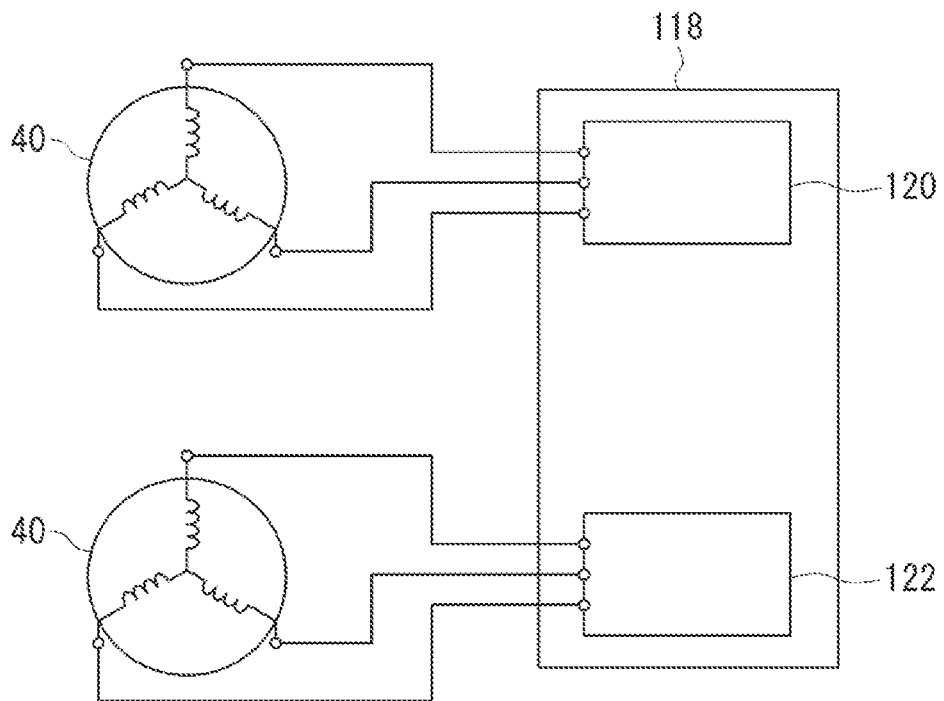
FIG. 4 illustrates a general concept of a connection that schematically indicates an example of a connection different from FIG. 2 between electric motors and a plurality of driving circuits in an electric brake apparatus according to an embodiment of the present invention.

For example, in the configuration provided as illustrated in FIG. 4, the change in the value of the current flowing in the electric motor 40 on the upper side (or the lower side) in FIG. 4 is exhibited as indicated by the polygonal line RD2 in FIG. 3 when power is supplied from both the two driving circuits 120 and 122 and the braking force is generated by the two electric motors 40, and is exhibited as indicated by the polygonal line RD1 in FIG. 3 when power is supplied from only the driving circuit 120 (or 122) and the braking force is generated by only the electric motor 40 on the upper side (or the lower side). In other words, the value of the current flowing in the electric motor 40 is higher when power is supplied to only any one of the driving circuits 120 and 122 (RD1) than when power is supplied to both the two driving circuits 120 and 122 (RD2), similarly to the configuration illustrated in FIG. 2. Then, the value of the current flowing in the electric motor 40 increases since after the contact position CP on both RD1 and RD2, and the change amount (the gradient) of this increase is larger on RD1 than on RD2. Therefore, the electronic control device 118 also detects the point at which the value of the current flowing in the electric motor 40 starts increasing when power is supplied to only any one of the two driving circuits 120 and 122 (RD1) as the contact position CP in the configuration provided as illustrated in FIG. 4.

In the above-described manner, the electric brake apparatus 1 according to the embodiments of the present invention includes the electrically-driven motor (the electric motor) 40, the electric mechanism, and the control device (the electronic control device) 118 as illustrated in FIGS. 1, 2, and 4, and the electric motor 40 includes the plurality of (two in FIGS. 2 and 4) driving circuits 120 and 122 for driving this electric motor 40. The electric mechanism is used to press the braking member (the brake pads) 2 and 3 against the braking target member (the disk rotor) D based on the driving of the electric motor 40. The electronic control device 118 serves to control the driving of the electric motor 40 by controlling the plurality of driving circuits 120 and 122 and the like using various kinds of information, and detects the contact between the brake pads 2 and 3 and the disk rotor D to use it for such control.

More specifically, the electronic control device 118 detects the contact between the brake pads 2 and 3 and the disk rotor D based on the change in the current flowing in the electric motor 40 when power is supplied to a part of the driving circuits among the plurality of driving circuits 120 and 122 for driving the electric motor 40. Even more specifically, the electronic control device 118 monitors the amount of the current flowing in the electric motor 40 per positional change of the electric motor 40 that is exhibited as illustrated in FIG. 3, and detects the change in the current amount between before and after the brake pads 2 and 3 contact the disk rotor D according to the driving of the electric motor 40. In other words, the amount of the current flowing in the electric motor 40 increases due to the generation of the braking force after the brake pads 2 and 3 contact the disk rotor D compared to before this contact.

In addition, the electronic control device 118 monitors the amount of the current flowing in the electric motor 40 when power is supplied to a part of the driving circuits among the plurality of driving circuits 120 and 122 for driving the electric motor 40 (RD1), and therefore the change amount of the current between before and after the brake pads 2 and 3 contact the disk rotor D significantly increases compared to when power is supplied to all of the plurality of driving circuits 120 and 122 (RD2). In other words, the gradient of the current change with respect to the thrust force for generating the braking force increases. This facilitates such detection of the change point of the current amount, thereby allowing the electric brake apparatus 1 to increase the accuracy of detecting the contact position CP of the brake pads 2 and 3 with the disk rotor D. Further, in the case where the gradient is used to detect the change point of the current corresponding to the contact position CP in the relationship between the position of the electric motor 40 and the current value exhibited as illustrated in FIG. 3, an increase in the gradient like RD1 makes the detection less susceptible to the variation, thereby being able to improve the accuracy. On the other hand, in the case where the threshold value is used, an increase in the gradient like RD1 leads to a reduction in the time until the arrival to the threshold value, thereby being able to achieve quick detection.

Further, the variation in the clearance amount between the brake pads 2 and 3 and the disk rotor D can be reduced due to the improvement of the accuracy of detecting the contact position CP. This can contribute to securing an appropriate clearance amount between the brake pads 2 and 3 and the disk rotor D, thereby contributing to improving the brake responsiveness and also reducing the risk of a drag and the risk of causing a drag. In addition, supplying power to only a part of the driving circuits leads to a reduction in the thrust force with respect to the current, thereby contributing to reducing the load on the internal components at the time of the detection of the contact position CP.

Further, the electric brake apparatus 1 according to the embodiments of the present invention is configured in such a manner that the electronic control device 118 detects the contact between the brake pads 2 and 3 and the disk rotor D based on the change in the current of the electric motor 40 when power is supplied to only one driving circuit among the plurality of driving circuits 120 and 122. This configuration allows power to be always supplied to one driving circuit, which is the required minimum number, at the time of the detection of the contact between the brake pads 2 and 3 and the disk rotor D regardless of how many driving circuits are included in the plurality of driving circuits. Therefore, this configuration can increase the change amount of the current flowing in the electric motor 40 between before and after the contact between the brake pads 2 and 3 and the disk rotor D as much as possible, thereby allowing the electric brake apparatus 1 to further increase the accuracy of detecting the contact of the brake pads 2 and 3 with the disk rotor D.

Further, the electric brake apparatus 1 according to the embodiments of the present invention is configured in such a manner that, because the electric motor 40 is an electric motor having double windings as illustrated in FIG. 2, this single electric motor 40 is driven by the two driving circuits 120 and 122. Then, the electronic control device 118 can detect the contact accurately by detecting the contact between the brake pads 2 and 3 and the disk rotor D based on the change in the current of the electric motor 40 when power is supplied to only any one of such two driving circuits 120 and 122.

The electric brake apparatus 1 according to the embodiments of the present invention may be configured in such a manner that the electronic control device 118 supplies power to only a part of the driving circuits among the plurality of driving circuits 120 and 122 to drive the electric motor 40 when the brake pads 2 and 3 contact the disk rotor D, also including when the vehicle is braked while running normally and when the vehicle is braked by the parking brake. Also supplying power to only a part of the driving circuits at the time of the braking in this manner leads to a reduction in the thrust force with respect to the current, thereby contributing to reducing the load on the internal components while securing the redundancy for the driving of the electric motor 40. At the same time, the present configuration also allows the electric brake apparatus 1 to increase the detection accuracy when detecting the contact of the brake pads 2 and 3 with the disk rotor D.

Then, the electric brake apparatus 1 according to the embodiments of the present invention is not limited to the configuration provided as illustrated in FIGS. 1, 2, and 4, and can be configured in any manner as long as being configured to detect the contact between the brake pads 2 and 3 and the disk rotor D based on the change in the current of the electric motor 40 when power is supplied to a part of the driving circuits among the plurality of driving circuits. For example, the number of the plurality of driving circuits is not limited to two, and may be three or more. Further, the electric brake apparatus 1 may be configured with the components illustrated in FIGS. 1, 2, and 4 partially removed or changed, and/or with a new component added thereto. In addition, any component capable of fulfilling the function required for each component may be used as each component.

Possible configurations as the electric brake apparatus 1 based on the present embodiments include the following examples.

According to a first configuration, an electric brake apparatus (1) includes an electric motor (40) including a plurality of driving circuits (120, 122), an electric mechanism configured to press a braking member (2, 3) against a braking target member (D) based on driving of the electric motor (40), and a control device (118) configured to control the driving of the electric motor (40). The control device (118) detects contact between the braking member (2, 3) and the braking target member (D) based on a change in a current of the electric motor (40) when power is supplied to a part of the driving circuits among the plurality of driving circuits (120, 122).

According to a second configuration, in the first configuration, the control device (118) detects the contact between the braking member (2, 3) and the braking target member (D) based on the change in the current of the electric motor (40) when power is supplied to only one of the driving circuits among the plurality of driving circuits (120, 122).

According to a third configuration, in the second configuration, the electric motor (40) is an electric motor having double windings.

According to a fourth configuration, an electric brake apparatus (1) includes an electric motor (40) including a plurality of driving circuits (120, 122), an electric mechanism configured to press a braking member (2, 3) against a braking target member (D) based on driving of the electric motor (40), and a control device (118) configured to control the driving of the electric motor (40). The control device (118) drives the electric motor (40) by supplying power to only a part of the driving circuits among the plurality of driving circuits (120, 122) when the braking member (2, 3) contacts the braking target member (D).

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of any embodiment can be replaced with the configuration of another embodiment. Further, any embodiment can also be implemented with a configuration of another embodiment added to the configuration of this embodiment. Further, any embodiment can also be implemented with another configuration added, deleted, or replaced with respect to a part of the configuration of this embodiment.

REFERENCE SIGNS LIST

1 electric brake apparatus
2, 3 braking member (brake pad)
40 electrically-driven motor (electric motor)
118 control device (electronic control device)
120, 122 driving circuit
D braking target member (disk rotor)

The invention claimed is:
1. An electric brake apparatus comprising:
an electric motor including driving circuits;

a brake mechanism configured to press a braking member against a braking target member based on driving of the electric motor; and
a control device configured to control the driving of the electric motor,
wherein the control device is configured to supply power to a part of the driving circuits when all of the driving circuits are operating normally such that a gradient of a change in a current of the electric motor with respect to a thrust force for generating a braking force increases to detect contact between the braking member and the braking target member based on the change in the current of the electric motor.
2. The electric brake apparatus according to claim 1, wherein the control device is configured to supply power to only one of the driving circuits when all of the driving circuits are operating normally such that the gradient of the change in the current of the electric motor with respect to the thrust force for generating the braking force increases to detect contact between the braking member and the braking target member based on the change in the current of the electric motor.
3. The electric brake apparatus according to claim 2, wherein the electric motor has double windings.

*   *   *   *   *